US010988262B2

(12) United States Patent
Horner et al.

(10) Patent No.: US 10,988,262 B2
(45) Date of Patent: Apr. 27, 2021

(54) CABIN PRESSURE CONTROL SYSTEM ARCHITECTURE USING CABIN PRESSURE AIR FOR INLET TO APU CORE COMPRESSOR

(71) Applicant: HONEYWELL INTERNATIONAL INC., Morris Plains, NJ (US)

(72) Inventors: Darrell Horner, Oro Valley, AZ (US); Gerard McCoy, Tucson, AZ (US); Andrew Zug, Costa Mesa, CA (US); Melissa Dopkins, Chicago, IL (US)

(73) Assignee: Honeywell International Inc., Charlotte, NC (US)

( * ) Notice: Subject to any disclaimer, the term of this patent is extended or adjusted under 35 U.S.C. 154(b) by 467 days.

(21) Appl. No.: 16/055,089

(22) Filed: Aug. 4, 2018

(65) Prior Publication Data
US 2019/0283884 A1    Sep. 19, 2019

Related U.S. Application Data

(60) Provisional application No. 62/642,754, filed on Mar. 14, 2018.

(51) Int. Cl.
*B64D 13/04* (2006.01)
*B64D 41/00* (2006.01)
*B64D 13/06* (2006.01)

(52) U.S. Cl.
CPC .......... *B64D 13/04* (2013.01); *B64D 41/00* (2013.01); *B64D 2013/0611* (2013.01); *B64D 2013/0688* (2013.01); *B64D 2041/002* (2013.01)

(58) Field of Classification Search
CPC ........ B64D 41/00; B64D 13/06; B64D 13/08; B64D 2013/0611; B64D 2013/0688; B64D 2041/002; B64D 13/04
See application file for complete search history.

(56) References Cited

U.S. PATENT DOCUMENTS

| 4,642,997 A | 2/1987 | Krafka |
| 5,186,681 A * | 2/1993 | Emmons ................ B64D 13/04 454/74 |

(Continued)

FOREIGN PATENT DOCUMENTS

| CA | 2606739 A1 | 4/2008 |
| CA | 2933365 A1 | 12/2016 |

(Continued)

OTHER PUBLICATIONS

EP Search Report, application No. 19162670.4, dated Jul. 19, 2019.

(Continued)

*Primary Examiner* — Assres H Woldemaryam
(74) *Attorney, Agent, or Firm* — Shumaker & Sieffert, P.A.

(57) ABSTRACT

A pressure control system includes an overboard valve in indirect communication with a first enclosed environment and in direct communication with a second enclosed environment. The first environment is suitable for human occupancy and configured to receive pressurized air from an environmental control system. The second environment is configured to receive the pressurized air from the first environment. An inboard valve is configured to supply a discharge of pressurized air from the second environment. An outflow valve is configured to regulate a discharge of air from the first environment to an area outside the first and second environments. A positive pressure relief valve configured to regulate a discharge of air from the first environment. A negative pressure relief valve configured to regulate an ingress of air into the first environment. A control valve is configured to regulator and supply pressurized air from the first environment to a compressor.

18 Claims, 15 Drawing Sheets

(56) References Cited

U.S. PATENT DOCUMENTS

| | | | |
|---|---|---|---|
| 5,461,882 A | 10/1995 | Zywiak | |
| 5,482,229 A | 1/1996 | Asshauer | |
| 5,956,960 A | 9/1999 | Niggeman | |
| 5,967,461 A | 10/1999 | Farrington | |
| 6,159,091 A | 12/2000 | Horstman et al. | |
| 6,283,410 B1 | 9/2001 | Thompson | |
| 8,480,460 B2 | 7/2013 | Schwarz | |
| 8,694,181 B2* | 4/2014 | Horner | B64D 13/00 701/3 |
| 8,876,040 B2 | 11/2014 | Petrac | |
| 9,302,775 B2 | 4/2016 | Houssaye | |
| 10,625,874 B2 | 4/2020 | Rideau et al. | |
| 10,661,907 B2 | 5/2020 | Blumer et al. | |
| 2003/0126864 A1 | 7/2003 | Thompson | |
| 2009/0006056 A1* | 1/2009 | Horner | B64F 5/60 703/7 |
| 2009/0088063 A1 | 4/2009 | Schwarz | |
| 2010/0173575 A1* | 7/2010 | Horner | B64D 13/04 454/74 |
| 2013/0306790 A1 | 11/2013 | Bruno et al. | |
| 2015/0034771 A1 | 2/2015 | Joubert et al. | |
| 2015/0266585 A1 | 9/2015 | Krittian | |
| 2015/0367952 A1 | 12/2015 | Rideau et al. | |
| 2016/0009409 A1 | 1/2016 | Rideau | |
| 2016/0083100 A1* | 3/2016 | Bammann | B64D 13/06 62/89 |
| 2016/0231031 A1 | 8/2016 | Bruno | |
| 2016/0356280 A1 | 12/2016 | Pascu et al. | |
| 2017/0036768 A1 | 2/2017 | Stieger et al. | |
| 2017/0037774 A1 | 2/2017 | Jones et al. | |
| 2017/0037775 A1 | 2/2017 | Jones et al. | |
| 2017/0037776 A1 | 2/2017 | Jones et al. | |
| 2017/0081031 A1 | 3/2017 | Bammann et al. | |
| 2017/0129614 A1 | 5/2017 | Bammann et al. | |
| 2018/0065752 A1* | 3/2018 | Franco | B64D 13/06 |
| 2019/0367171 A1 | 12/2019 | Zug | |
| 2019/0367173 A1 | 12/2019 | Zug | |

FOREIGN PATENT DOCUMENTS

| | | |
|---|---|---|
| CA | 2933990 A1 | 12/2016 |
| CN | 105539861 A | 5/2016 |
| EP | 2639157 A2 | 9/2013 |
| FR | 2986780 A1 | 8/2013 |
| WO | 2011056285 A1 | 5/2011 |
| WO | 2013072603 A1 | 5/2013 |
| WO | 2014118455 A1 | 8/2014 |

OTHER PUBLICATIONS

Intent to Grant dated Mar. 6, 2020, from counterpart European Application No. 19162670.4, 82 pp.

U.S. Appl. No. 16/839,923, by Honeywell Aerospace (Inventors: Blumer et al.), filed Apr. 3, 2020.

* cited by examiner

| Outflow Valve (OFV) - 1 (Incl. Valve Position Sensor) | Outflow Valve (OFV) - 2 (Incl. Valve Position Sensor) if used | APU Control Valve (APU CV) (Incl. Valve Position Sensor) | Overboard Valve (OVBD Valve) | Inboard Valve (INBD Valve) |
|---|---|---|---|---|
| Full open - maintains low residual pressure | Full open - maintains low residual pressure | Full open - enables APU to ingress all required air with no limitation | Full open - exhausts EE bay heat directly overboard | Full closed - ensures EE bay heat directly exhausted via OVBD valve |

| Positive Pressure Relief Valve (PPRV) | Negative Pressure Relief Valve (NPRV) | Outflow Valve Control Unit (OCU) - 1 (Incl. Cabin Pressure Sensor and Ambient Pressure Sensor from air data computer) | Outflow Valve Control Unit (OCU) - 2 (Incl. Cabin Pressure Sensor and Ambient Pressure Sensor from air data computer) | APU Control Valve Control Unit (ACVCU) | Ventilation Control (VC) |
|---|---|---|---|---|---|
| Closed | Closed | Commands all valves open (OFVs, APU CV) Cntrl OFV 1 open | Cntrl OFV 2 open | Cntrl APU CV open | Commands OVBD valve open and INBD valve closed |

Taxi

FIG. 4

Takeoff
FIG. 5

| Outflow Valve (OFV)-1 (Incl. Valve Position Sensor) | Outflow Valve (OFV)-2 (Incl. Valve Position Sensor) if Used | APU Control Valve (APU CV) (Incl. Valve Position Sensor) | Overboard Valve (OVBD Valve) | Inboard Valve (INBD Valve) |
|---|---|---|---|---|
| Modulated towards closed to backpressure fuselage to ~0.1 psid | Modulated towards closed to backpressure fuselage to ~0.1 psid | Full open - enables APU to ingress all required air with no limitation | Full closed to seal air exhaust path | Full open - enables EE bay heat to exhaust via OFV 1 |

| Positive Pressure Relief Valve (PPRV) | Negative Pressure Relief Valve (NPRV) | Outflow Valve Control Unit (OCU) -1 (Incl. Cabin Pressure Sensor and Ambient Pressure Sensor from air data computer) | Outflow Valve Control Unit (OCU) -2 (Incl. Cabin Pressure Sensor and Ambient Pressure Sensor from air data computer) | APU Control Valve Control Unit (ACVCU) | Ventilation Control (VC) |
|---|---|---|---|---|---|
| Closed | Closed | Commands OFVS to modulate, using sensor feedback, commands APU CV open Cntrl OFV 1 motor speed | Cntrl OFV 2 motor speed | Cntrl APU CV open | Commands OVBD valve close and INBD valve open |

| Outflow Valve (OFV)-1 (Incl. Valve Position Sensor) | Outflow Valve (OFV)-2 (Incl. Valve Position Sensor) if Used | APU Control Valve (APU CV) (Incl. Valve Position Sensor) | Overboard Valve (OVBD Valve) | Inboard Valve (INBD Valve) |
|---|---|---|---|---|
| Modulated in response to OCU 1 controls | Modulated in response to OCU 2 controls | Full open - enables APU to ingress all required air with no limitation | Full closed to seal air exhaust path | Full open - enables EE bay heat to exhaust via OFV 1 |

| Positive Pressure Relief Valve (PPRV) | Negative Pressure Relief Valve (NPRV) | Outflow Valve Control Unit (OCU) -1 (Incl. Cabin Pressure Sensor and Ambient Pressure Sensor from air data computer) | Outflow Valve Control Unit (OCU) -2 (Incl. Cabin Pressure Sensor and Ambient Pressure Sensor from air data computer) | APU Control Valve Control Unit (ACVCU) | Ventilation Control (VC) |
|---|---|---|---|---|---|
| Closed | Closed | Commands OFVs to modulate, using sensor feedback, commands APU CV open cntrl OFV 1 motor speed | Cntrl OFV 2 motor speed | Cntrl APU CV open | Commands OVBD valve close and INBD valve open |

Low Altitude Climb
FIG. 6

| Outflow Valve (OFV) -1 (Incl. Valve Position Sensor) | Outflow Valve (OFV) -2 (Incl. Valve Position Sensor) if Used | APU Control Valve (APU CV) (Incl. Valve Position Sensor) | Overboard Valve (OVBD Valve) | Inboard Valve (INBD Valve) | |
|---|---|---|---|---|---|
| Modulated mostly closed in response to OCU 1 controls - causing most air to exhaust via APU duct | Modulated mostly closed in response to OCU 2 controls - causing most air to exhaust via APU duct | Modulated - enables APU to ingress relatively high pressure cabin air, using almost 100% of produced ECS air flow (less fuselage leakage) | Full closed to seal air exhaust path | Full open - enables EE bay heat to exhaust via OFV 1 | |
| Positive Pressure Relief Valve (PPRV) | Negative Pressure Relief Valve (NPRV) | Outflow Valve Control Unit (OCU) - 1 (Incl. Cabin Pressure Sensor and Ambient Pressure Sensor from air data computer) | Outflow Valve Control Unit (OCU) - 2 (Incl. Cabin Pressure Sensor and Ambient Pressure Sensor from air data computer) | APU Control Valve Control Unit (ACVCU) | Ventilation Control (VC) |
| Closed | Closed | Commands OFVs to modulate, using sensor feedback, commands APU CV to modulate. Cntrl OFV 1 motor speed | Cntrl OFV 2 motor speed | Cntrl APU CV modulate | Commands OVBD valve close and INBD valve open |

High Altitude

FIG. 7

| Outflow Valve (OFV) -1 (Incl. Valve Position Sensor) | Outflow Valve (OFV) -2 (Incl. Valve Position Sensor) if used | APU Control Valve (APU CV) (Incl. Valve Position Sensor) | Overboard Valve (OVBD Valve) | Inboard Valve (INBD Valve) | | |
|---|---|---|---|---|---|---|
| Modulated mostly closed in response to OCU 1 controls - causing most air to exhaust via APU duct | Modulated mostly closed in response to OCU 2 controls - causing most air to exhaust via APU duct | Full open - enables APU to ingress all required air with no limitation | Full closed to seal air exhaust path | Full open - enables EE bay heat to exhaust via OFV 1 | | |
| Positive Pressure Relief Valve (PPRV) | Negative Pressure Relief Valve (NPRV) | Outflow Valve Control Unit (OCU) - 1 (Incl. Cabin Pressure Sensor and Ambient Pressure Sensor from air data computer) | Outflow Valve Control Unit (OCU) - 2 (Incl. Cabin Pressure Sensor and Ambient Pressure Sensor from air data computer) | APU Control Valve Control Unit (ACVCU) | Ventilation Control (VC) | |
| Closed | Closed | Commands OFVs to modulate, using sensor feedback, commands APU CV open Cntrl OFV 1 motor speed | Cntrl OFV 2 motor speed | Cntrl APU CV open | Commands OVBD valve close and INBD valve open | |

Low Attitude Descent

FIG. 8

| Outflow Valve (OFV)-1 (Incl. Valve Position Sensor) | Outflow Valve (OFV)-2 (Incl. Valve Position Sensor) if used | APU Control Valve (APU CV) (incl. Valve Position Sensor) | Overboard Valve (OVBD Valve) | Inboard Valve (INBD Valve) |
|---|---|---|---|---|
| Full open - maintains low residual pressure | Full open - maintains low residual pressure | Full open - enables APU to ingress all required air with no limitation | Full open - exhausts EE bay heat directly overboard | Full closed - ensures EE bay heat directly exhausted via OVBD valve |

| Positive Pressure Relief Valve (PPRV) | Negative Pressure Relief Valve (NPRV) | Outflow Valve Control Unit (OCU) - 1 (Incl. Cabin Pressure Sensor and Ambient Pressure Sensor from air data computer) | Outflow Valve Control Unit (OCU) - 2 (Incl. Cabin Pressure Sensor and Ambient Pressure Sensor from air data computer) | APU Control Valve Control Unit (ACVCU) | Ventilation Control (VC) |
|---|---|---|---|---|---|
| Closed | Closed | Commands all valves open (OFVs, APU VC) Cntrl OFV 1 open | Cntrl OFV 2 open | Cntrl APU CV open | commands OVBD valve open and INBD valve closed |

Residual Pressure

FIG. 9

| Outflow Valve (OFV) -1 (Incl. Valve Position Sensor) | Outflow Valve (OFV) -2 (Incl. Valve Position Sensor) if used | APU Control Valve (APU CV) (Incl. Valve Position Sensor) | Overboard Valve (OVBD Valve) | Inboard Valve (INBD Valve) |
|---|---|---|---|---|
| Modulated mostly closed in response to OCU 1 controls - causing most air to exhaust via APU duct. During overpressure override, OFV is modulated slightly more open | Modulated mostly closed in response to OCU 2 controls - causing most air to exhaust via APU duct. During overpressure override, OFV is modulated slightly more open | Modulated - enables APU to ingress relatively high pressure cabin air, using almost 100% of produced ECS air flow (less fuselage leakage). During overpressure override, APU CV is modulated slightly more open | Full closed to seal air exhaust path | Full open - enables EE bay heat to exhaust via OFV 1 |

| Positive Pressure Relief Valve (PPRV) | Negative Pressure Relief Valve (NPRV) | Outflow Valve Control Unit (OCU) - 1 (Incl. Cabin Pressure Sensor and Ambient Pressure Sensor from air data computer) | Outflow Valve Control Unit (OCU) - 2 (Incl. Cabin Pressure Sensor and Ambient Pressure Sensor from air data computer) | APU Control Valve Control Unit (ACVCU) | Ventilation Control (VC) |
|---|---|---|---|---|---|
| Closed | Closed | Commands OFVs to modulate, using sensor feedback, commands APU CV to modelate. Cntrl OFV 1 motor speed | Cntrl OFV 2 motor speed | Cntrl APU CV to modulate | Commands OVBD valve close and INBD valve open |

Overppressure - Automatic

FIG. 10

| Outflow Valve (OFV) -1 (Incl. Valve Position Sensor) | Outflow Valve (OFV) -2 (Incl. Valve Position Sensor) if used | APU Control Valve (APU CV) (Incl. Valve Position Sensor) | Overboard Valve (OVBD Valve) | Inboard Valve (INBD Valve) |
|---|---|---|---|---|
| Possibly failed closed | Possibly failed closed | Modulated - enables APU to ingress relatively high pressure cabin air, using almost 100% of produced ECS air flow (less fuselage leakage), possibly without enough control authority to provide overpressure protection | Full closed to seal air exhaust path | Full open - enables EE bay heat to exhaust via OFV 1 |

| Positive Pressure Relief Valve (PPRV) | Negative Pressure Relief Valve (NPRV) | Outflow Valve Control Unit (OCU) - 1 (Incl. Cabin Pressure Sensor and Ambient Pressure Sensor From air data computer) | Outflow Valve Control Unit (OCU) - 2 (Incl. Cabin Pressure Sensor and Ambient Pressure Sensor from air data computer) | APU Control Valve Control Unit (ACVCU) | Ventilation Control (VC) |
|---|---|---|---|---|---|
| During overpressure override, PPRV regulates differential pressure to calibrated setpoint. | Closed | Commands OFVs to modulate, using sensor feedback, commands APU CV to modulate. Cntrl OFV 1 motor speed - possibly failed | Cntrl OFV 2 motor speed - possibly failed | Cntrl APU CV open | Commands OVBD valve close and INBD valve open |

Overpppressure - Pneumatic

FIG. 11

| Outflow Valve (OFV) -1 (Incl. Valve Position Sensor) | Outflow Valve (OFV) -2 (Incl. Valve Position Sensor) if used | APU Control Valve (APU CV) (Incl. Valve Position Sensor) | Overboard Valve (OVBD Valve) | Inboard Valve (INBD Valve) | |
|---|---|---|---|---|---|
| During negative pressure override, OFV is modulated to full open. | During negative pressure override, OFV is modulated to full open. | Full open | Full closed to seal air exhaust path | Full open - enables EE bay heat to exhaust via OFV 1 | |

| Positive Pressure Relief Valve (PPRV) | Negative Pressure Relief Valve (NPRV) | Outflow Valve Control Unit (OCU) - 1 (Incl. Cabin Pressure Sensor and Ambient Pressure Sensor from air data computer) | Outflow Valve Control Unit (OCU) - 2 (Incl. Cabin Pressure Sensor and Ambient Pressure Sensor from air data computer) | APU Control Valve Control Unit (ACVCU) | Ventilation Control (VC) |
|---|---|---|---|---|---|
| Closed | Closed | Commands OFVs to modulate open, using sensor feedback, commands APU CV open Cntrl OFV 1 motor speed | Cntrl OFV 2 motor speed | Cntrl APU CV to full open | Commands OVBD valve close and INBD valve open |

Negative Pressure - Automatic

FIG. 12

| Outflow Valve (OFV) -1 (Incl. Valve Position Sensor) | Outflow Valve (OFV) -2 (Incl. Valve Position Sensor) if used | APU Control Valve (APU CV) (Incl. Valve Position Sensor) | Overboard Valve (OVBD Valve) | Inboard Valve (INBD Valve) |
|---|---|---|---|---|
| Possibly failed closed | Possibly failed closed | Full open. APU to ingress relatively high pressure cabin air, using almost 100% of produced ECS air flow (less fuselage leakage). Possibly without enough control authority to provide overpressure protection | Full closed to seal air exhaust path | Full open - enables EE bay heat to exhaust via OFV 1 |

| Positive Pressure Relief Valve (PPRV) | Negative Pressure Relief Valve (NPRV) | Outflow Valve Control Unit (OCU) - 1 (Incl. Cabin Pressure Sensor and Ambient Pressure Sensor from air data computer) | Outflow Valve Control Unit (OCU) - 2 (Incl. Cabin Pressure Sensor and Ambient Pressure Sensor from air data computer) | APU Control Valve Control Unit (ACVCU) | Ventilation Control (VC) |
|---|---|---|---|---|---|
| Closed | During negative pressure override, NPRV opens to ingress ambient air into the cabin | Commands OFVs to modulate open, using sensor feedback, commands APU CV open Cntrl OFV 1 motor speed - possibly failed | Cntrl OFV 2 motor speed - possibly failed | Cntrl APU CV open | Commands OVBD valve close and INBD valve open |

Negative Pressure - Mechanical

FIG. 13

| Outflow Valve (OFV) -1 (Incl. Valve Position Sensor) | Outflow Valve (OFV) -2 (Incl. Valve Position Sensor) if used | APU Control Valve (APU CV) (Incl. Valve Position Sensor) | Overboard Valve (OVBD Valve) | Inboard Valve (INBD Valve) |
|---|---|---|---|---|
| Modulated mostly closed in response to OCU 1 controls - causing most air to exhaust via APU duct. OFV 1 position is modulated in proportion to OFV 2 to properly bias outflow exhaust | Modulated mostly closed in response to OCU 1 controls - causing most air to exhaust via APU duct. OFV 1 position is modulated in proportion to OFV 2 to properly bias outflow exhaust | Modulated - enables APU to ingress relatively high pressure cabin air, using almost 100% of produced ECS air flow (less fuselage leakage) | Full closed to seal air exhaust path | Full open - enables EE bay heat to exhaust via OFV 1 |

| Positive Pressure Relief Valve (PPRV) | Negative Pressure Relief Valve (NPRV) | Outflow Valve Control Unit (OCU) - 1 (Incl. Cabin Pressure Sensor and Ambient Pressure Sensor from air data computer) | Outflow Valve Control Unit (OCU) - 2 (Incl. Cabin Pressure Sensor and Ambient Pressure Sensor from air data computer) | APU Control Valve Control Unit (ACVCU) | Ventilation Control (VC) |
|---|---|---|---|---|---|
| Closed | Closed | Commands OFVs to modulate in proportion to one another, using sensor feedback, commands APU CV to modulate. Cntrl OFV 1 motor speed | Cntrl OFV 2 motor speed | Cntrl APU CV modulate | Commands OVBD valve close and INBD valve open |

Ventilation

FIG. 14

CABIN PRESSURE CONTROL SYSTEM ARCHITECTURE USING CABIN PRESSURE AIR FOR INLET TO APU CORE COMPRESSOR

CROSS-REFERENCE TO RELATED APPLICATIONS

This application claims priority to and the benefit of U.S. provisional application No. 62/642,754 filed Mar. 14, 2018 which is incorporated herein in its entirety.

BACKGROUND OF THE INVENTION

The present invention generally relates to compressors and, more particularly, to apparatus and methods for providing pressurized air to compressors.

In flight, cabin pressure control systems (CPCSs) normally exhaust pressurized cabin air directly to atmosphere pressure.

On some aircraft, this pressurized cabin air is used to provide a very small amount of aft thrust by utilizing a thrust recovery type outflow valve that speeds the cabin air exhaust to super-sonic pressure ratios and directs this exhaust as close to the aft direction as is geometrically possible—given the constraints of the valve installation. Thrust recovery valves are not aerodynamically efficient when full-open on the ground with a low pressure ratio, and thus are very large, heavy, and expensive. Further, thrust recovery valves operate with very high aerodynamic torques, causing very large rotary actuator gear boxes and motors. This makes the rotary actuators very heavy and expensive, and requires higher-current motor controllers (which also dissipate more power, and are large and expensive).

An alternative use of cabin air exhaust for its potential energy is considered where the cabin air exhaust is consumed directly by the APU core compressor. This pressurized air enables increased APU operating efficiency relative to the APU ingesting atmosphere air—especially when the airplane is in flight and the atmosphere air is at relatively (to the pressurized cabin) low pressure.

Various schemes to utilize the cabin air exhaust have been considered, but the impact on normal cabin pressure functionality and certain failure conditions have not been solved. For example, how can the CPCS satisfy APU flow demands while also controlling the cabin pressure in a safe and comfortable manner? How can the CPCS ensure low residual pressure across the fuselage and proper electronics engineering bay ventilation during ground operation, or if the APU has failed? How should the CPCS compensate for a stuck APU shut-off valve that prevents the (normal) air flow path from the cabin to the APU?

As can be seen, there is a need for improved apparatus and methods to provide pressurized air to compressors.

SUMMARY OF THE INVENTION

In one aspect of the present invention, a pressure control system comprises an overboard valve in indirect communication with a first enclosed environment and in direct communication with a second enclosed environment; wherein the first environment is suitable for human occupancy and configured to receive pressurized air from an environmental control system; wherein the second environment is configured to receive the pressurized air from the first environment; an inboard valve configured to supply a discharge of pressurized air from the second environment; an outflow valve configured to regulate a discharge of air from the first environment to an area outside the first and second environments; a positive pressure relief valve configured to regulate a discharge of air from the first environment; a negative pressure relief valve configured to regulate an ingress of air into the first environment; and a control valve configured to supply and regulate pressurized air from the first environment to a compressor.

In another aspect of the present invention, a pressure control system comprises a first outflow valve configured to receive pressurized air from a first enclosed environment suitable for human occupancy; wherein the first outflow valve is in air communication with an ambient atmosphere; a positive pressure relief valve in air communication with the first environment and with the ambient atmosphere; a negative pressure relief valve in communication with the first environment and with the ambient atmosphere; a control valve configured to regulate and supply pressurized air from the first environment to a compressor; and a controller in communication with the outflow valve and the control valve; wherein the controller is configured to control the pressurized air in the first environment; and concurrently control the pressurized air to the compressor.

In a further aspect of the present invention, a non-transitory computer readable medium with computer executable instructions stored thereon, executed by a processor, to perform a method for controlling pressurized air in a first enclosed environment suitable for human occupancy and for controlling the pressurized air from the first enclosed environment to a compressor, the method comprises modulating, via the processor, an outflow valve downstream of the first enclosed environment; and modulating, via the processor, a control valve intermediate the outflow valve and the compressor.

These and other features, aspects and advantages of the present invention will become better understood with reference to the following drawings, description and claims.

BRIEF DESCRIPTION OF THE DRAWINGS

FIG. 4 is a table of system function (at gate/taxi) versus system component status according to an embodiment of the present invention;

FIG. 5 is a table of system function (at takeoff) versus system component status according to an embodiment of the present invention;

FIG. 6 is a table of system function (at low altitude climb) versus system component status according to an embodiment of the present invention;

FIG. 7 is a table of system function (at high altitude climb/cruise) versus system component status according to an embodiment of the present invention;

FIG. 8 is a table of system function (at low altitude descent) versus system component status according to an embodiment of the present invention;

FIG. 9 is a table of system function (residual pressure protection) versus system component status according to an embodiment of the present invention;

FIG. 10 is a table of system function (overpressure protection—automatic control) versus system component status according to an embodiment of the present invention;

FIG. 11 is a table of system function (overpressure protection—pneumatic override) versus system component status according to an embodiment of the present invention;

FIG. 12 is a table of system function (negative pressure protection—automatic control) versus system component status according to an embodiment of the present invention;

FIG. 13 is a table of system function (negative pressure protection—mechanical override) versus system component status according to an embodiment of the present invention;

FIG. 14 is a table of system function (airflow exhaust) versus system component status according to an embodiment of the present invention;

DETAILED DESCRIPTION OF THE INVENTION

Figure 1:
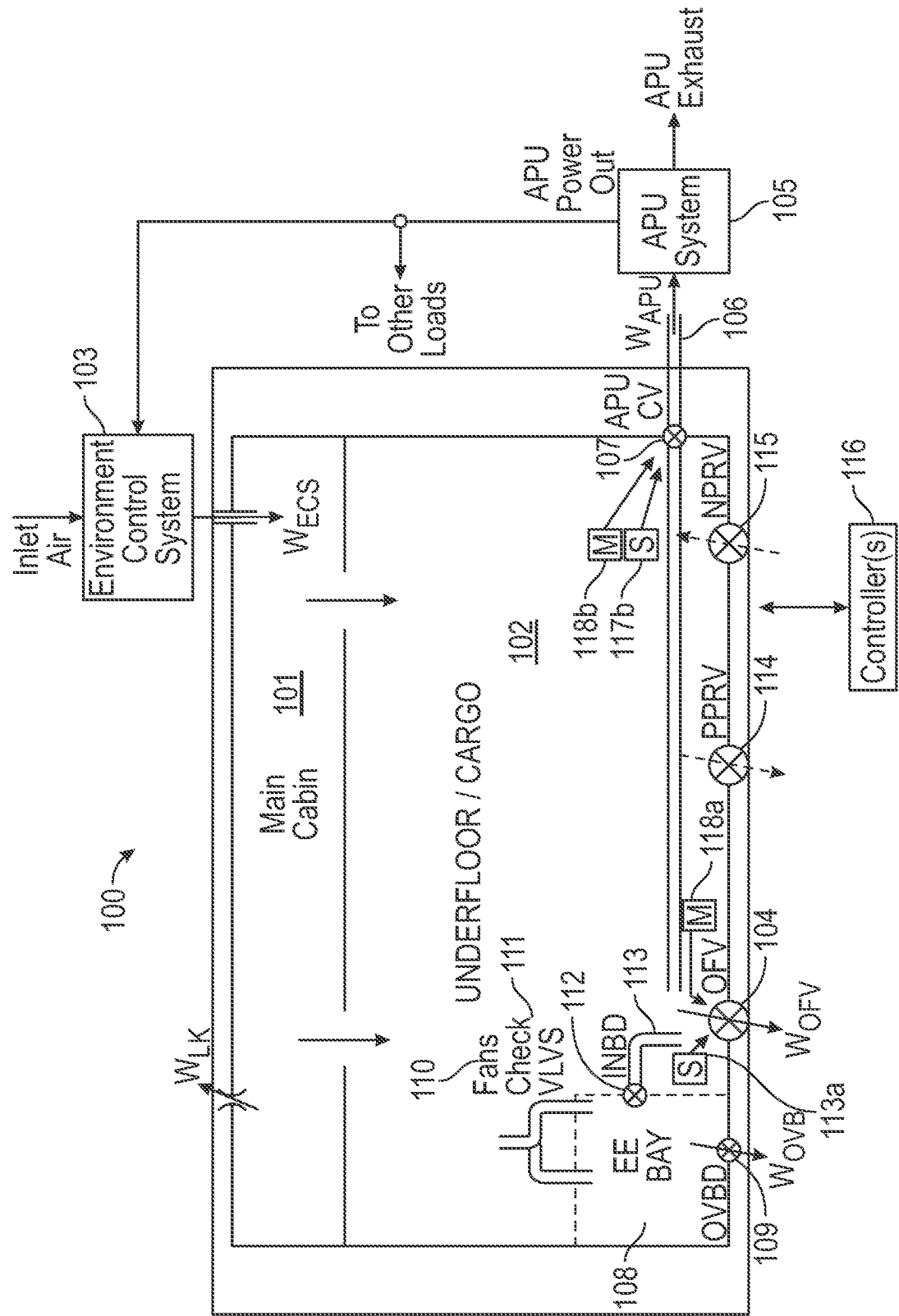
FIG. 1 is schematic diagram of a pressure control system according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention provides apparatus and methods to feed compressed air, from an enclosed environment, to a compressor. In the context of aircraft, the present invention is a cabin pressure control system (CPCS) architecture that provides the source air to the APU core compressor while still performing normal CPCS functionality. The invention can provide solutions to: 1) the communication of air to the APU core compressor, 2) the shut off of air to the APU in the event of a failure mode, 3) the ventilation of electronic bays, galleys, and other heat or odor sources, and 4) the control of cabin pressure in a safe and comfortable manner.

This invention may include a CPCS that not only controls the cabin pressure but also provides air to the APU core compressor to improve the APU efficiency during flight. The CPCS may include an APU Control Valve (CV) which may regulate air in flow to the APU and shuts off flow in the event of various failure modes.

As more fully described below, the APU CV may be controlled open during normal operation at lower altitudes. The APU CV can be utilized to modulate flow into the APU during high altitude operation when the CPCS outflow valves are mostly/fully closed in order to control cabin altitude/pressure commands. The APU CV may include two or more motors and motor controllers to ensure proper safety redundancy in the event of certain failure modes. A position sensor can provide feedback representative of CV position.

In the application of aircraft, the APU CV may also include a mounting location at the pressure bulkhead, or just inside the pressure bulkhead to prevent cabin decompression in the event of a duct failure between the pressure bulkhead and the APU.

As more fully described below, the CPCS of the present invention may include an outflow valve (OFV) that is used to control cabin pressure during takeoff, for flight between takeoff and maximum cruise altitude, for flight during descent below maximum cruise to landing, and during landing. It can be nearly fully closed during cruise conditions to maximize air inflow to the APU via the APU CV.

As more fully described below, the OFV can be controlled to full open on the ground at the gate and during taxi conditions to ensure that the residual pressure limits of the airplane are not exceeded for safe and comfortable door opening. The OFV may contain a position sensor representative of OFV position. The OFV can be sized to ensure the residual pressure limits can be maintained in the event of loss of APU flow at maximum ECS flow. The OFV sizing considers the availability of an overboard (OVBD) valve for on-ground conditions.

The OFV can be commanded closed during situations where a decompression is occurring. The OFV may contain two or more motors (and motor controllers) to overcome first motor (or motor controller) failure without affecting control and safe flight. Alternatively, two OFVs are provided when cabin exhaust air flow biasing can be required (sometimes necessary for local heat and odor eliminations and to reduce axial flow currents in the passenger compartment) by the airplane design.

The CPCS of the present invention may include one or more positive pressure relief valves (PPRVs) to ensure that the structural positive differential pressure limits are not exceeded in the event of total closure of the OFV(s) and APU CV.

One or more negative pressure relief valves (NPRVs) may ensure that the structural negative differential pressure limits are not exceeded in the event of loss of ECS flow and the OFV(s) and APU CV are closed.

In the CPCS of the present invention, as more fully described below, an open Overboard (OVBD) valve and a closed Inboard (INBD) valve and circulation fans may ensure proper ventilation of an EE (Electrical Equipment) bay compartment(s) when the airplane is on the ground and there is not enough differential pressure across the fuselage to induce adequate ventilation flow. When the differential pressure across the fuselage is adequate to induce a ventilation flow, the OVBD valve is closed and the INBD valve is open to cause EE bay compartment flow either through the OFV or the APU CV.

Ducting from the area near the OFV to the APU CV may ensure proper air flow ventilation from the EE bay or cargo area(s) to the APU CV when the APU is in operation (the OVBD valve is closed and the INBD valve is open).

In the CPCS of the invention, cabin pressure controllers (CPC) can have redundant channels in the event of failures to continue to control the CPCS after the first controller failure or the first OFV or APU CV motor failure. There may be redundant cabin pressure sensors to control cabin pressure and to detect failure cases required to maintain cabin pressure safety.

Although the present invention is described below in the context of aircraft, the present invention is not so limited. For example, the present invention may be implemented in land vehicles.

As will be appreciated by one skilled in the art, aspects of the present invention may be embodied as a system, method, or computer program product.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable media having computer readable program code embodied thereon.

Any combination of one or more computer readable storage media may be utilized. A computer readable storage medium is an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is any tangible medium that can store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram of a pressure control system 100 according to an exemplary embodiment of the present invention. As an example, the system 100 may be employed in a vehicle such as an aircraft. In the example of an aircraft, the aircraft may have a first enclosed environment suitable for human occupancy (e.g., a main cabin) 101 that is combined with and in direct airflow communication with the underfloor/cargo area 102 and may have a second enclosed environment (e.g., an EE Bay area) 108.

In an exemplary embodiment, the CPCS 100 may be positioned in the cargo area 102. The CPCS 100 may generally include an outflow valve (OFV) 104 in air flow communication with the cabin/cargo 101/102, an APU control valve (CV) 107 intermediate the OFV 104 and an APU 105 that requires a source of air, an overboard (OBVD) valve 109 in parallel to the OFV 104, a positive pressure relief valve (PPRV) 114 in parallel to the OFV 104, and a negative pressure relief valve (NPRV) 115 in parallel to the PPRV 114. A controller(s) 116 may control one or more of the above components (overboard 109, OFV 104, or APU control valve 107, but not the PPRV 114 or NPRV 115) during various phases of operation of a vehicle (e.g., an aircraft), such as taxi, takeoff, cruise, and landing.

During aircraft operation, mass air inflow Wecs into the cabin 101 may be provided by an environmental control system 103. Mass air leakage Wlk may exit the cabin 101 and underfloor/cargo 102.

Mass air exhaust Wofv from the cabin 101 and/or the cargo 102 may be via the OFV 104. Mass air exhaust Wapu from the cabin and cargo to the APU core compressor 105 may be via an APU inlet duct 106 and through the APU CV 107.

Figure 2A:
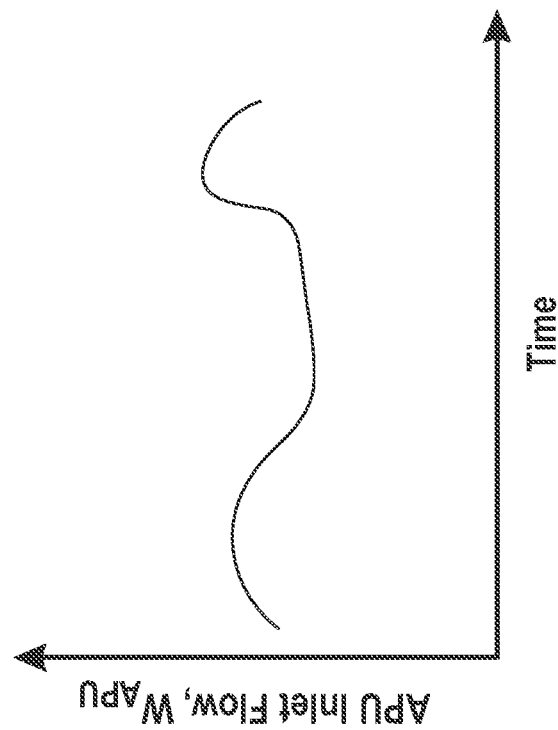
FIGS. 2A-2B are graphs of inlet flow to a compressor according to an embodiment of the present invention.
Figure 2B:
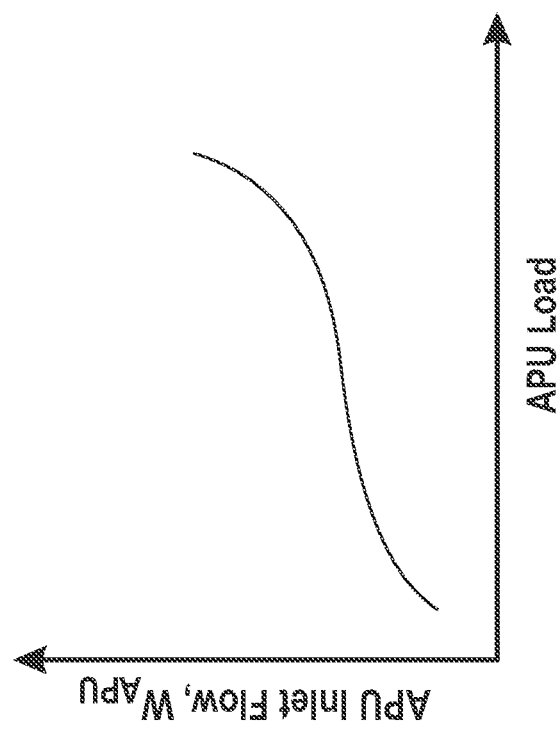

As shown in FIGS. 2A-2B, the air flow Wapu to the APU 105 can be variable over time (FIG. 2B) due to the variable APU operating loads (FIG. 2A) from the systems it services (e.g., air load and rotary shaft output loads) or due to airplane altitude or other factors.

Referring back to FIG. 1, when on the ground, additional mass air Wovb may exhaust from the cabin/cargo 101/102, via an enclosed environment 108, such as an electronics engineering (EE) bay, and through the OBVD valve 109 that is in direct air flow communication with the EE bay 108. Thus, at the same time, the OBVD valve 109 may be in indirect air flow communication with the cabin/cargo 101/102.

On the ground, with the OVBD valve 109 open, EE bay 108 air may be forced, via fan(s) 110, into the EE bay. With check valve(s) 111, air flow can be prevented from recirculating out of the EE bay 108 when the fans are not operating (such as in flight or during EE bay fan failure).

During flight, with the OVBD valve 109 closed, normal exhaust through the EE bay 108 may be provided via an opened inboard (INBD) valve 112 and a duct 113 which may empty directly above the OFV 104. The open INBD valve 112 can be configured to supply a discharge of pressurized air from the EE bay 108. The OFV 104 can be configured to regulate a discharge of air from the cabin 101 and underfloor/cargo area 102 to an area outside the cabin 101 and underfloor/cargo area 102 and the EE bay 108, such as overboard.

A differential pressure across the OFV 104 is the source of the flow out of the EE bay 108—i.e., a local lower pressure induces flow through the EE bay 108. If the OFV 104 is closed, the EE bay 108 air through the INBD valve 112 is "sucked" into the duct 106 that ultimately feeds the APU core compressor 105 via the APU CV 107.

In order to accomplish this OFV 104 and CV 107 control logic, position sensors 117a,b can be utilized on both the OFV and CV, with a controller(s) 116 to provide respective valve position feedback throughout their entire stroke. Motors 118a,b, also in communication with the controller(s) 116 can provide the controlled movement of the OFV 104 and the CV 107.

Although not shown in FIG. 1, but similar to the EE bay 108 example, galley and/or lavatory heat loads or odors may be induced by ducting galley/lavatory air to an area local to the OFV 104 or APU inlet duct 106.

Mass air flow can be controlled through the OFV 104, the OVBD valve 109, and the APU CV 107 to both ensure adequate APU air inlet quantity and to ensure that the cabin pressure may be controlled comfortably according to various airplane functional needs. Thus, the APU CV 107 can indirectly supply pressurized air from the cabin 101 to the APU 105.

The positive pressure relief valve (PPRV) 114 may be configured to regulate a discharge of air from the cabin 101, under certain positive over pressure conditions, to an area outside of the cabin 101 and the EE bay 108, such as overboard. Thus, the PPRV 114 may ensure that the structural positive differential pressure limits are not exceeded in the event of total closure of the OFV 104 and the APU CV 107.

The negative pressure relief valve (NPRV) 115 may be configured to regulate an ingress of air into the cabin 101, under certain negative over pressure conditions, from an area outside the cabin 101 and the EE bay 108, such as ambient. Thus, the NPRV 115 may ensure that the structural negative differential pressure limits are not exceeded in the event of loss of ECS flow Wecs and the OFV 104 and the APU CV 107 are closed.

Figure 3:
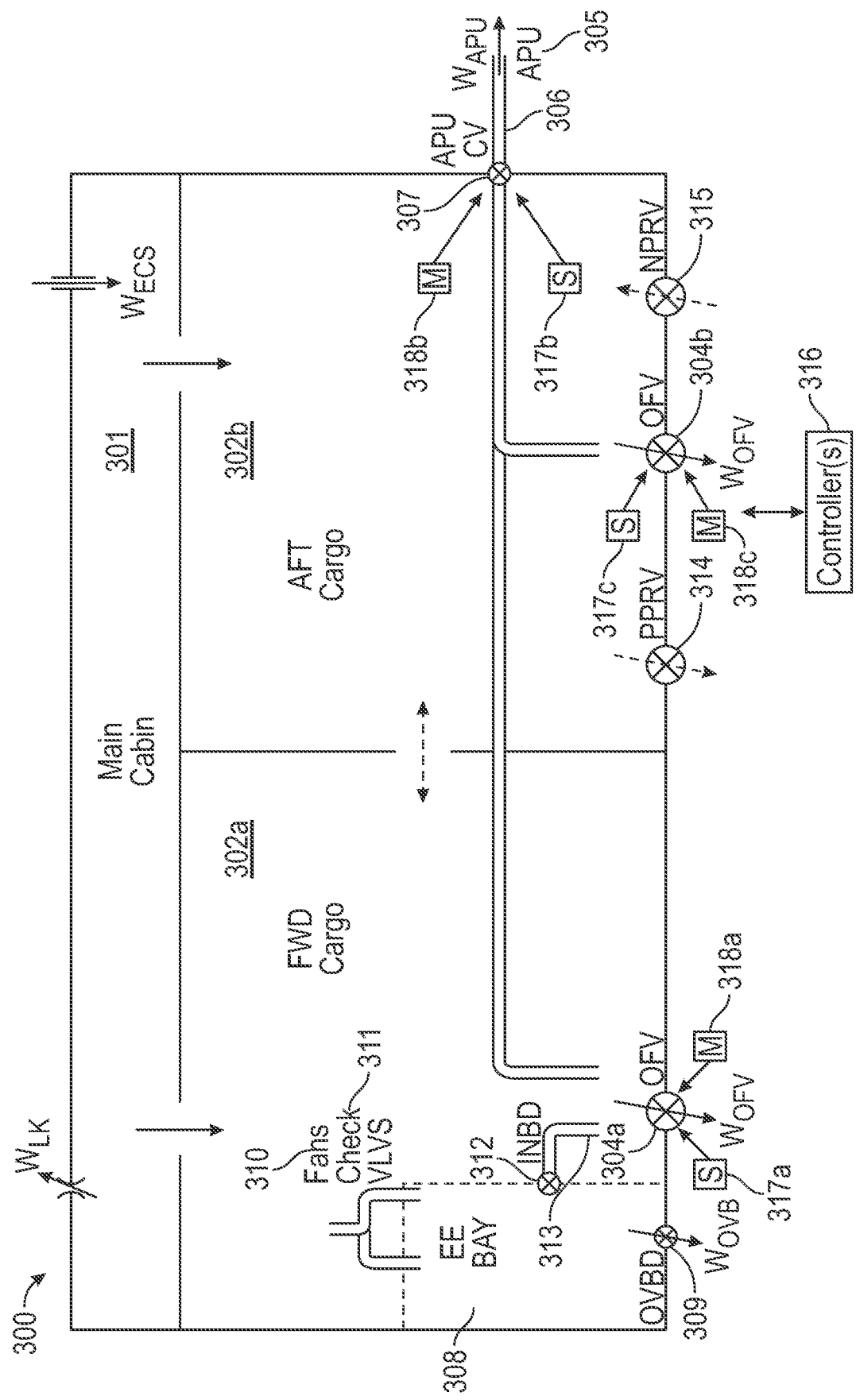
FIG. 3 is a schematic diagram of a pressure control system according to another embodiment of the present invention.

In FIG. 3, according to embodiments, a cabin pressure control system (CPCS) 300 can be similar to that described in relation to FIG. 1. Accordingly, reference numbers in FIG. 3 correspond to like reference numbers in FIG. 1.

For larger aircraft that require cabin air exhaust flow biasing (sometimes necessary for local heat and odor eliminations and to reduce axial flow currents in the passenger compartment), the CPCS 300 can have two OFVs 304a,b (instead of just one OFV as in FIG. 1) located such that air is exhausted from the appropriate compartments in specified proportions. In this case, OFVs 304a,b can include respective position sensors 317a,c that can provide continuous-position feed throughout the stroke of the valve. This can enable the CPCS controller(s) 316 (i.e., computer with processor, memory, and database) to know the OFV positions and control the OFVs/Wofvs relative to each other to maintain the desired biasing. Motors 318a,c associated with the OFVs can implement valve movement.

Various CPCS and APU system failure modes can be accommodated by the CPCS architecture of the present invention. The following exemplary functions are provided by this invention—in either or both exemplary embodiments of FIGS. 1 and 3.

On ground, if the APU 105/305 stops operating or if the APU CV 107/307 is stuck in the mostly closed position, the ECS flow (Wecs) can be exhausted through the OFV(s) 104/304a,b and/or the OVBD valve 109/309. Thus, the OFV(s) and the OVBD valve can be sized to handle this Wecs to ensure that the 0.028 psid (for example) residual pressure threshold is not exceeded.

In the event of a duct failure between a pressure bulkhead (not shown) and the APU 105/305, the APU CV 107/307 can be placed at the pressure bulkhead of the aircraft, or near the pressure bulkhead on the inside, so that the APU CV 107/307 can be closed to prevent air from escaping the cabin during flight, thereby preventing a potential decompression.

During flight, if there is a loss of ECS flow (i.e., Wecs goes to zero), to prevent rapid decompression, the OFV(s) 104/304a,b and/or the APU CV 107/307 can be commanded closed to trap the available air in the fuselage. This may require that each of the OFV(s) and the APU CV to have redundant means of control (motors and motor control channels), in case the primary means of control already has a first failure that would otherwise prevent control of the valve.

During flight, in the event of an erroneous opening of an OFV by one of the CPCS controllers, the inventive CPCS can provide redundant and dissimilar means to:

detect a decompression and identify this to the pilot and the rest of the CPCS;

disable the erroneously acting active control channel;

transfer control to a remaining available CPCS control channel;

automatically close the open OFV.

In the event there is a total loss of cabin air exhaust via the OFV(s) 104/304a,b and/or the APU CV 107/307 such that there is a build-up of cabin-to-ambient pressure in the fuselage, one or more PPRVs 114/314 can provide an independent means of limiting the differential pressure. Each PPRV may be sized to be able to limit the differential pressure considering that the OFV(s) and APU CV are fully closed with the maximum ECS flow (Wecs) and with blockage of the leakage path (Wlk). SAE ARP1270 guidelines indicate the PPRV is sized to also handle these conditions with the airplane climbing at the maximum climb rate possible.

In the event that there is a loss of ECS flow (i.e., Wecs is zero), and the airplane is rapidly descending from a high altitude (above 15000 feet) to a safe altitude (approximately 10,000 feet), and because this situation can result in the OFV(s) 104/304a,b and/or the APU CV 107/307 to be closed to trap the air in the cabin to prevent further depressurization, one or more NPRVs 115, 315 can provide ingress air from atmosphere in the event the pressure on the outside of the airplane exceeds that in the "pressurized" cabin. Each NPRV may be sized to be able to limit the differential pressure of the fuselage to its rated limit, considering the maximum descent rate of the airplane, and considering no other apertures (OFV(s), leakage paths, etc.) can ingress air.

In order to prevent the inability to dispatch the airplane on high utilization airplanes where inability to dispatch is a significant economic loss, in the event of a completely failed OFV, the CPCS can have a quantity of two OFVs and at least two motors (and motor controllers) per OFV for added redundancy.

EXAMPLES—OPERATING CONDITIONS

Identification of Operating Mode: the CPCS can look at one or more of the following parameters, in an exemplary embodiment, to determine which "mode" of operation the airplane/CPCS is in:

Weight-on-Wheels—WOW—the input from the landing gear proximity switches, indicating whether the landing gear detects it is on the ground or not;

Takeoff-Throttle—TOT—used to detect the transition from ground/taxi to takeoff mode;

Cabin Doors Proximity Switches—used to detect if at least one cabin door is not fully locked/latched;

Airplane Altitude and Ambient Pressure—above/below a certain altitude (say 15,000 feet) is almost always indicating flight (above), and also used to detect climb, vs. cruise, vs. descent, and high altitude vs. low altitude;

Airplane Rate of Climb—used to detect transition from ground to flight (climb), cruise to descent, etc.;

Wheel Speed—indicating taxiing speed for transition into flight to landing, and taxi to flight;

Computed Air Speed—CAS—used to detect ground/taxi vs. flight;

Cabin Pressure (from cabin pressure control system)—used with Ambient Pressure to determine if the overpressure or negative pressure protection function is required;

Outflow Valve Position—determined if the OFV is open. After which, we transition from landing to ground mode.

Ground conditions: On the ground when the airplane is parked or during taxi, the cabin-to-ambient differential pressure must be less than, for example, 0.028 psid to ensure that all cabin doors may be safely and comfortably closed. As the APU CV is held completely open, most of the air entering the cabin (Wecs) may exit the cabin through the APU. However, the OFV may be fully open on the ground to ensure that the differential pressure limit is not exceeded. The OVBD valve is open and the INBD valve is closed to ensure that the EE bay air is exhausted directly overboard.

If there is a failure of the APU (so that it does not operate) or if the APU CV is closed, the OFV must be sized such that the differential pressure maximum of 0.028 psid (for example) is not exceeded when Wecs flow is exhausted through it. As the OVBD valve also exhausts cabin air, this valve may be used to augment the OFV to achieve the 0.028 psid limit.

If there is a residual pressure protection requirement, whereby the 0.028 psid limit must be never exceeded or else an unsafe condition will occur when cabin doors are opened, then it is possible a second OFV may be used to overcome any combination of "stuck" OFV or "stuck" OVBD valve or "stuck" APU CV scenario.

Ground/takeoff conditions: On the ground, during takeoff or immediately after landing, the APU CV is controlled to the full-open position, and the cabin pressure is controlled completely by modulating the OFV(s). At takeoff, the cabin pressure is controlled smoothly to approximately 0.106 psid (for example). At landing, the cabin is fully depressurized to the residual pressure of less than 0.028 psid (for example) at a comfortable rate.

If there is a fluctuation of the air mass flow drawn from the cabin by the APU due to APU output service (e.g., air power or mechanical output shaft power) loading or other factors, the OFV(s) compensate to ensure this mass flow fluctuation (Wapu) does not result in uncomfortable cabin pressure fluctuations.

During takeoff or immediately after landing, the OVBD valve may be fully closed and the EE bay air is funneled by the INBD valve duct to the OFV inlet side. The OFV inlet, characterized by a suction effect as air is accelerated into it for exhaust overboard, induces air flow from the EE bay into the INBD valve/duct.

Flight conditions: During climb to high altitude and during descent from high altitude, the APU CV is controlled to the full-open position, and the cabin pressure is controlled completely by modulating the OFV(s). During climb, the cabin pressure is controlled to a schedule or predetermined pressure (that is a function of the airplane altitude) to ensure that the cabin pressure rates are limited for comfort, but the cabin-to-atmosphere differential pressure is limited to the fuselage structural limits. During descent, the cabin is controlled to the landing field elevation at a comfortable rate, but also subject to fuselage structural limits.

If there is a fluctuation of the air mass flow drawn from the cabin by the APU due to APU output service (e.g., air power or mechanical output shaft power) loading or other factors, the OFV(s) compensate to ensure this mass flow fluctuation (Wapu) does not result in uncomfortable cabin pressure fluctuations.

During these flight conditions, the OVBD valve is fully closed, and EE bay air is funneled by the INBD valve duct to the OFV inlet side. The OFV inlet, characterized by a suction effect as air is accelerated into it for exhaust overboard, induces air flow from the EE bay into the INBD valve/duct.

Flight conditions: During the final climb to cruise conditions, during cruise, and during the initial descent at high altitude, maximizing air mass flow rate to the APU may be accomplished by commanding the OFV(s) closed or to nearly closed position, and the APU CV is controlled/modulated to regulate the cabin pressure by controlling Wapu. The cabin pressure is regulated to a predefined altitude that is a function of the airplane altitude. In the event that the APU CV does not have enough control authority to either ensure a comfortable cabin pressure or achieve cabin altitude/pressure commands, the OFV(s) will be commanded to augment the Wapu flow. The APU CV may not have enough control authority because it either: (1) may be completely open (cannot open further to control the cabin to its commanded altitude/pressure), or (2) may not be able to be commanded further closed, because the APU CV cannot completely close (or even close beyond a threshold Wapu flow limit), otherwise the APU will not be able to operate to service its loads.

EXAMPLES—FUNCTIONAL GOALS

Automatic Cabin Pressure Control—Ground—at gate and taxi: the goals are to achieve very low residual pressure across fuselage to enable cabin/cargo doors to open, enable ventilation of hot EE bay air out of fuselage, and enable APU to operate ECS. FIG. 4 is a table that describes, in an exemplary embodiment of the foregoing functional goals, the operating status of the CPCS components which may be controlled by a controller(s).

Automatic Cabin Pressure Control—Ground—at takeoff: the goals are to control to a ~0.1 psid back pressure across the fuselage to get cabin pressure dynamically capable of responding to takeoff roll and lift off air inflow/ground effect transients, route hot EE bay air out of OFV 1 (enables OFVs to control cabin pressure), and enable APU to operate ECS. FIG. 5 is a table that describes, in an exemplary embodiment of the foregoing functional goals, the operating status of the CPCS components which may be controlled by a controller(s).

Automatic Cabin Pressure Control—Flight—at low altitude climb out: the goals are to control cabin pressure according to pre-determined logic/schedule, limit pressure and pressure rates of change to a comfortable values, limit cabin altitude and fuselage differential pressure to safe limits—APU uses most of the air through a full-open APU CV, then the OFVs are used to control/modulate cabin pressure as required, route hot EE bay air out of OFV 1 (enables OFVs to control cabin pressure), and enable APU to operate ECS. FIG. 6 is a table that describes, in an exemplary embodiment of the foregoing functional goals, the operating status of the CPCS components which may be controlled by a controller(s).

Automatic Cabin Pressure Control—Flight—at high altitude climb, high altitude cruise, high altitude descent: the goals are to control cabin pressure according to pre-determined logic/schedule, limit pressure and pressure rates of change to a comfortable values, limit cabin altitude and fuselage differential pressure to safe limits—OFVs are mostly closed (but are still modulated to balance flows between direct exhaust and APU, and APU CV is used to control cabin pressure, route hot EE bay air out of OFV 1 (enables OFVs to control cabin pressure), and enable APU to operate ECS by utilizing most of the ECS air flow (e.g., not flowing as much air out of OFVs). FIG. 7 is a table that describes, in an exemplary embodiment of the foregoing functional goals, the operating status of the CPCS components which may be controlled by a controller(s).

Automatic Cabin Pressure Control—Flight—at low altitude descent until landing: the goals are to control cabin pressure according to pre-determined logic/schedule, limit pressure and pressure rates of change to a comfortable values, limit cabin altitude and fuselage differential pressure to safe limits, ultimately cause the cabin altitude to be roughly 300 feet lower than the landing field elevation—APU uses most of the air through a full-open APU CV, then the OFVs are used to control/modulate cabin pressure as required, route hot EE bay air out of OFV 1 (enables OFVs to control cabin pressure), and enable APU to operate ECS. FIG. 8 is a table that describes, in an exemplary embodiment of the foregoing functional goals, the operating status of the CPCS components which may be controlled by a controller(s).

Residual Pressure Protection: the goal is to ensure that cabin and cargo doors can be opened with very low risk of popping open and injuring flight crew personnel. For a one OFV system (1× OFV, 1× OVBD, and APU CV), at least two of the three devices can be open. For a two OFV system (2× OFV, 1× OVBD, and APU CV), at least three of the four devices can be open. Controllers (using system inputs) check and balance each other to determine with high certainty that the airplane is not in flight and valves are all open. Monitor functions (included in the OCUs) disable automatic functions if erroneously closing valves. FIG. 9 is a table that describes, in an exemplary embodiment of the foregoing functional goals, the operating status of the CPCS components which may be controlled by a controller(s).

Overpressure Protection—Automatic Control System: the goal is that automatic control function will limit the cabin-to-ambient differential pressure to a variable limit, increasing with airplane altitude (i.e., limits structural loading at low altitudes). This is performed by modulating the OFVs to ensure that the fuselage does not pressurize beyond the variable limit. The monitor function shuts down the automatic function if the limits are exceeded—causing the pilot to select to manual control. FIG. 10 is a table that describes, in an exemplary embodiment of the foregoing functional goals, the operating status of the CPCS components which may be controlled by a controller(s).

Overpressure Protection—Pneumatic Override: the goal is to address when the automatic control function possibly failed. The pneumatic control function (via the PPRV) limits the differential pressure to a single limit. The PPRV monitors the differential pressure across a spring loaded diaphragm. When the differential pressure is exceeded, a pilot valve modulates the actuation chamber pressure, causing regulation of the differential pressure to the limit (with tolerances). FIG. 11 is a table that describes, in an exemplary embodiment of the foregoing functional goals, the operating status of the CPCS components which may be controlled by a controller(s).

Negative Pressure Protection—Automatic Control System: the goal is that automatic control function will control the actual cabin altitude to below the airplane altitude, except when the landing field elevation is actually "selected" above the true landing field elevation. Then, the airplane "fly" through cabin and normal control laws will open the OFVs. In the event that the cabin is still pressurized, the monitor function will disable automatic control and cause manual control to be selected. FIG. 12 is a table that describes, in an exemplary embodiment of the foregoing functional goals, the operating status of the CPCS components which may be controlled by a controller(s).

Negative Pressure Protection—Mechanical Override: the goal is to address when the automatic control function is possibly failed. The mechanical control (via the NPRV or ORV) works when outside pressure is greater than the inside pressure. At this condition, the valves are forced open from the outside, allowing ingress of higher pressure ambient air. FIG. 13 is a table that describes, in an exemplary embodiment of the foregoing functional goals, the operating status of the CPCS components which may be controlled by a controller(s).

Airflow Exhaust Bias to Support Ventilation: the goal, during normal automatic or semiautomatic control, is that the ventilation system provides a flow biasing "command" such that a percentage of cabin air flow out the fwd versus the aft OFVs. Cabin pressure control laws determine the actual valve position as an input to the control laws. Actual motor speed commands are proportioned according to the control laws to modulate each OFV at a percentage of flow. Since the flow is maximized to the APU, the system will include the APU CV as the third exhaust flow path, ensuring that both OFVs are as closed as possible during this sequence. FIG. 14 is a table that describes, in an exemplary embodiment of the foregoing functional goals, the operating status of the CPCS components which may be controlled by a controller(s).

Figure 15:
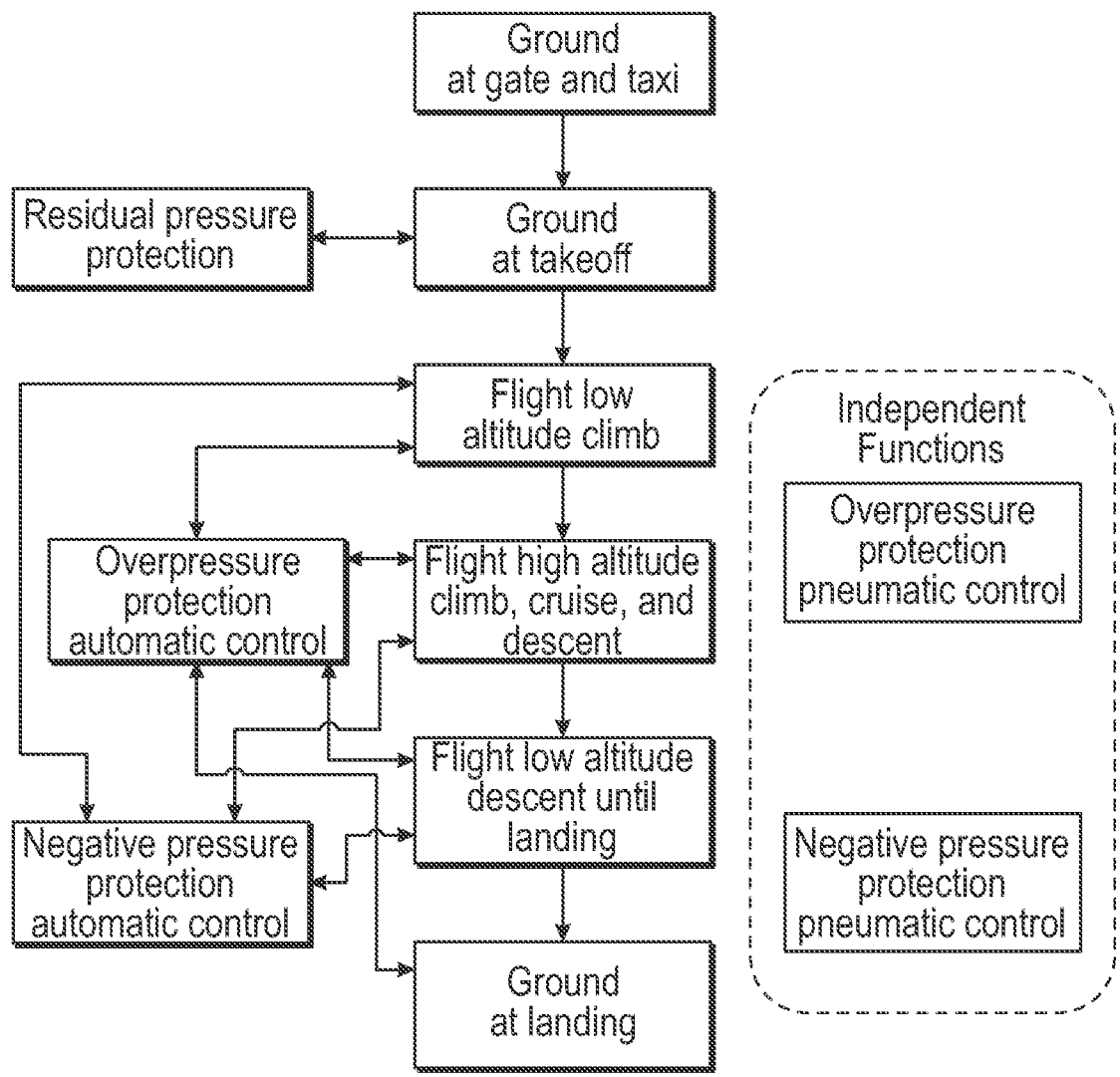
FIG. 15 is a schematic diagram of relationships of system functions according to an embodiment of the present invention.

FIG. 15 is a schematic diagram illustrating, according to an exemplary embodiment, the overall relationships between operational mode and system control function, as individually shown in FIGS. 4-14.

It should be understood, of course, that the foregoing relates to exemplary embodiments of the invention and that modifications may be made without departing from the spirit and scope of the invention as set forth in the following claims.

We claim:

1. A pressure control system, comprising:
   an overboard valve in indirect communication with a first enclosed environment and in direct communication with a second enclosed environment;
   wherein the first environment is suitable for human occupancy and configured to receive pressurized air from an environmental control system;
   wherein the second environment is configured to receive the pressurized air from the first environment;
   an inboard valve configured to supply a discharge of pressurized air from the second environment;
   an outflow valve configured to regulate a discharge of air from the first environment to an area outside the first and second environments;
   a positive pressure relief valve configured to regulate a discharge of air from the first environment;
   a negative pressure relief valve configured to regulate an ingress of air into the first environment; and
   a control valve configured to supply and regulate pressurized air from the first environment to a compressor.

2. The system of claim 1, wherein the second environment is not suitable for human occupancy.

3. The system of claim 1, wherein inboard valve is further configured to supply a discharge of air from the first environment.

4. The system of claim 1, wherein the outflow valve is in air communication with the inboard valve and with ambient atmosphere.

5. The system of claim 1, wherein the positive pressure relief valve is in air communication with the outflow valve and with ambient atmosphere.

6. The system of claim 1, wherein the negative pressure relief valve is in air communication with the outflow valve and with ambient atmosphere.

7. The system of claim 1, wherein the control valve is in air communication with the outflow valve, the positive pressure relief valve, and the negative pressure relief valve.

8. A pressure control system, comprising:
   a first outflow valve configured to receive pressurized air from a first enclosed environment suitable for human occupancy;
   wherein the first outflow valve is in air communication with an ambient atmosphere;
   a positive pressure relief valve in air communication with the first environment and with the ambient atmosphere;
   a negative pressure relief valve in communication with the first environment and with the ambient atmosphere;
   a control valve configured to supply and regulate pressurized air from the first environment to a compressor; and
   a controller in communication with the outflow valve and the control valve;
   wherein the controller is configured to:
   control the pressurized air in the first environment; and
   concurrently control the pressurized air to the compressor.

9. The system of claim 8, wherein the positive pressure relief valve is configured to discharge air from the first environment to the ambient atmosphere.

10. The system of claim 8, wherein the negative pressure relief valve is configured to receive air from ambient atmosphere for supply to the first environment.

11. The system of claim 8, wherein the controller is further configured to alter the pressurized air in the first environment as the ambient atmosphere changes.

12. The system of claim 8, wherein the controller is further configured to alter the pressurized air to the compressor as the ambient atmosphere changes.

13. The system of claim 8, wherein the controller is further configured to alter the pressurized air to the first environment as a load on the compressor changes.

14. The system of claim 8, wherein the controller is further configured to alter the pressurized air to the compressor as a load on the compressor changes.

15. The system of claim 8, where in the controller is further configured to independently modulate the outflow valve and the control valve.

16. A non-transitory computer readable medium with computer executable instructions stored thereon, executed by a processor, to perform a method for controlling pressurized air in a first enclosed environment suitable for human occupancy and for controlling the pressurized air from the first enclosed environment to a compressor, the method comprising:
   modulating, via the processor, an outflow valve downstream of the first enclosed environment; and
   modulating, via the processor, a control valve intermediate the outflow valve and the compressor;
   wherein modulating the outflow valve and the control valve occurs in the absence of modulating, via the processor, a positive pressure relief valve disposed in parallel with a negative pressure relief valve.

17. The medium of claim 16, further comprising setting a respective valve position on the outflow valve and the control valve as an ambient atmosphere changes.

18. The medium of claim 16, further comprising setting a respective valve position on the outflow valve and the control valve as a load on the compressor changes.

* * * * *